United States Patent [19]

Gonzales et al.

[11] Patent Number: 5,757,967
[45] Date of Patent: May 26, 1998

[54] DIGITAL VIDEO DECODER AND DEINTERLACER, FORMAT/FRAME RATE CONVERTER WITH COMMON MEMORY

[75] Inventors: Cesar Augusto Gonzales, Katonah; Thomas Akos Horvath, Stormville; Elliot Neil Linzer, Bronx; Prasoon Tiwari, Yorktown Heights, all of N.Y.

[73] Assignee: IBM Corporation, Armonk, N.Y.

[21] Appl. No.: 545,046

[22] Filed: Oct. 19, 1995

[51] Int. Cl.⁶ .................................................. G06K 9/00
[52] U.S. Cl. .................................. 382/233; 382/239
[58] Field of Search ......................... 382/173, 171, 382/172, 224, 190, 209, 232, 233, 234, 235, 236, 238, 239, 240, 244, 245, 246, 250, 251, 253; 348/391, 384, 558, 555; 375/240; 395/139; 345/201; 378/98.2

[56] References Cited

U.S. PATENT DOCUMENTS

| | | | |
|---|---|---|---|
| 4,833,625 | 5/1989 | Fisher et al. | 364/518 |
| 4,843,466 | 6/1989 | Music et al. | 358/133 |
| 5,187,575 | 2/1993 | Lim | 358/140 |
| 5,253,053 | 10/1993 | Chu et al. | 358/133 |

*Primary Examiner*—Leo Boudreau
*Assistant Examiner*—Bijan Tadayon
*Attorney, Agent, or Firm*—Daniel P. Morris, Esq.; IBM Corporation

[57] ABSTRACT

A video decoder/format/frame rate converter with common memory is provided. This device decodes a compressed, interlaced video stream and converts the decoded output to a non-interlaced format and/or a format with a different frame rate.

23 Claims, 12 Drawing Sheets

FIG. 3
(PRIOR ART)

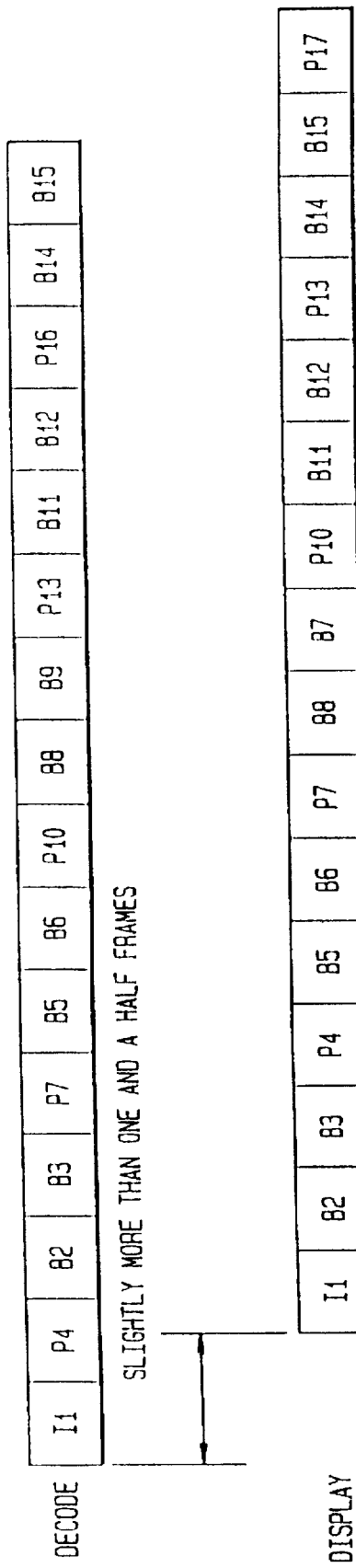
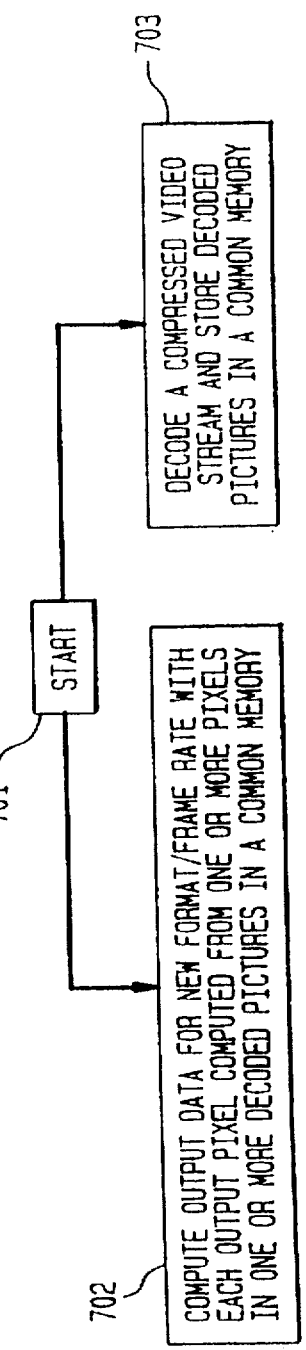

FIG. 12A

| DISPLAY # | 0 | 1 | 2 | 3 | 4 | 5 | 6 |
|---|---|---|---|---|---|---|---|
| CODING TYPE | R | B | B | R | B | B | R |
| ENCODE # | 0 | 2 | 3 | 1 | 5 | 6 | 4 |

FIG. 12B

| BANK | TIME -> | | | | | | |
|---|---|---|---|---|---|---|---|
| 0 | 0Raf, ref= | 2Bcf, ref=0 | 2Bcf, ref=0 | 2Bcf, ref=0 | 2Bcf, ref=0 | 2Bcf, ref=0 | 2Bcf, ref=0 |
| 1 | 0Ras, ref= | 2Bcs, ref=0 | 2Bcs, ref=0 | 2Bcs, ref=0 | 2Bcs, ref=0 | 2Bcs, ref=0 | 2Bcs, ref=0 |
| 2 | 0Rbf, ref= | 0Rbf, ref= | 2Bdf, ref=0 | 2Bdf, ref=0 | 2Bdf, ref=0 | 2Bdf, ref=0 | 2Bdf, ref=0 |
| 3 | 0Rbs, ref= | 0Rbs, ref= | 2Bds, ref=0 | 2Bds, ref=0 | 2Bds, ref=0 | 2Bds, ref=0 | 2Bds, ref=0 |
| 4 | 0Rcf, ref=1 | 0Rcf, ref=1 | 0Rcf, ref=1 | 2Bef, ref=0 | 2Bef, ref=0 | 2Bef, ref=0 | 2Bef, ref=0 |
| 5 | 0Rcs, ref=1 | 0Rcs, ref=1 | 0Rcs, ref=1 | 2Bes, ref=0 | 2Bes, ref=0 | 2Bes, ref=0 | 2Bes, ref=0 |
| 6 | 0Rdf, ref=1 | 0Rdf, ref=1 | 0Rdf, ref=1 | 0Rdf, ref=1 | 6Raf, ref=1 | 6Raf, ref=1 | 6Raf, ref=1 |
| 7 | 0Rds, ref=1 | 0Rds, ref=1 | 0Rds, ref=1 | 0Rds, ref=1 | 6Ras, ref=1 | 6Ras, ref=1 | 6Ras, ref=1 |
| 8 | 0Ref, ref=1 | 0Ref, ref=1 | 0Ref, ref=1 | 0Ref, ref= | 6Rbf, ref=1 | 6Rbf, ref=1 | 6Rbf, ref=1 |
| 9 | 0Res, ref=1 | 0Res, ref=1 | 0Res, ref=1 | 0Res, ref= | 6Rbs, ref=1 | 6Rbs, ref=1 | 6Rbs, ref=1 |
| 10 | 3Raf, ref=1 | 3Raf, ref=1 | 3Raf, ref=1 | 3Raf, ref=1 | 3Raf, ref=1 | 3Raf, ref=1 | 3Raf, ref=1 |
| 11 | 3Ras, ref=1 | 3Ras, ref=1 | 3Ras, ref=1 | 3Ras, ref=1 | 3Ras, ref=1 | 3Ras, ref=1 | 3Ras, ref=1 |
| 12 | 3Rbf, ref=1 | 3Rbf, ref=1 | 3Rbf, ref=1 | 3Rbf, ref=1 | 3Rbf, ref=1 | 3Rbf, ref=1 | 3Rbf, ref=1 |
| 13 | 3Rbs, ref=1 | 3Rbs, ref=1 | 3Rbs, ref=1 | 3Rbs, ref=1 | 3Rbs, ref=1 | 3Rbs, ref=1 | 3Rbs, ref=1 |
| 14 | 3Rcf, ref=1 | 3Rcf, ref=1 | 3Rcf, ref=1 | 3Rcf, ref=1 | 3Rcf, ref=1 | 3Rcf, ref=1 | 3Rcf, ref=1 |
| 15 | 3Rcs, ref=1 | 3Rcs, ref=1 | 3Rcs, ref=1 | 3Rcs, ref=1 | 3Rcs, ref=1 | 3Rcs, ref=1 | 3Rcs, ref=1 |
| 16 | 3Rdf, ref=1 | 3Rdf, ref=1 | 3Rdf, ref=1 | 3Rdf, ref=1 | 3Rdf, ref=1 | 3Rdf, ref=1 | 3Rdf, ref=1 |
| 17 | 3Rds, ref=1 | 3Rds, ref=1 | 3Rds, ref=1 | 3Rds, ref=1 | 3Rds, ref=1 | 3Rds, ref=1 | 3Rds, ref=1 |
| 18 | 3Ref, ref=1 | 3Ref, ref=1 | 3Ref, ref=1 | 3Ref, ref=1 | 3Ref, ref=1 | 3Ref, ref=1 | 3Ref, ref=1 |
| 19 | 3Res, ref=1 | 3Res, ref=1 | 3Res, ref=1 | 3Res, ref=1 | 3Res, ref=1 | 3Res, ref=1 | 3Res, ref=1 |
| 20 | 1Baf, ref=0 | 1Baf, ref=0 | 1Baf, ref=0 | 1Baf, ref=0 | 1Baf, ref=0 | 1Baf, ref=0 | 6Acf, ref=1 |
| 21 | 1Bas, ref=0 | 1Bas, ref=0 | 1Bas, ref=0 | 1Bas, ref=0 | 1Bas, ref=0 | 1Bas, ref=0 | 6Acs, ref=1 |
| 22 | 1Bbf, ref=0 | 1Bbf, ref=0 | 1Bbf, ref=0 | 1Bbf, ref=0 | 1Bbf, ref=0 | 1Bbf, ref=0 | 1Bbf, ref=0 |
| 23 | 1Bbs, ref=0 | 1Bbs, ref=0 | 1Bbs, ref=0 | 1Bbs, ref=0 | 1Bbs, ref=0 | 1Bbs, ref=0 | 1Bbs, ref=0 |
| 24 | 1Bcf, ref=0 | 1Bcf, ref=0 | 1Bcf, ref=0 | 1Bcf, ref=0 | 1Bcf, ref=0 | 1Bcf, ref=0 | 1Bcf, ref=0 |
| 25 | 1Bcs, ref=0 | 1Bcs, ref=0 | 1Bcs, ref=0 | 1Bcs, ref=0 | 1Bcs, ref=0 | 1Bcs, ref=0 | 1Bcs, ref=0 |
| 26 | 1Bdf, ref=0 | 1Bdf, ref=0 | 1Bdf, ref=0 | 1Bdf, ref=0 | 1Bdf, ref=0 | 1Bdf, ref=0 | 1Bdf, ref=0 |
| 27 | 1Bds, ref=0 | 1Bds, ref=0 | 1Bds, ref=0 | 1Bds, ref=0 | 1Bds, ref=0 | 1Bds, ref=0 | 1Bds, ref=0 |
| 28 | 1Bef, ref=0 | 1Bef, ref=0 | 1Bef, ref=0 | 1Bef, ref=0 | 1Bef, ref=0 | 1Bef, ref=0 | 1Bef, ref=0 |
| 29 | 1Bes, ref=0 | 1Bes, ref=0 | 1Bes, ref=0 | 1Bes, ref=0 | 1Bes, ref=0 | 1Bes, ref=0 | 1Bes, ref=0 |
| 30 | 2Baf, ref=0 | 2Baf, ref=0 | 2Baf, ref=0 | 2Baf, ref=0 | 2Baf, ref=0 | 2Baf, ref=0 | 2Baf, ref=0 |
| 31 | 2Bas, ref=0 | 2Bas, ref=0 | 2Bas, ref=0 | 2Bas, ref=0 | 2Bas, ref=0 | 2Bas, ref=0 | 2Bas, ref=0 |
| 32 | 2Bbf, ref=0 | 2Bbf, ref=0 | 2Bbf, ref=0 | 2Bbf, ref=0 | 2Bbf, ref=0 | 2Bbf, ref=0 | 2Bbf, ref=0 |
| 33 | 2Bbs, ref=0 | 2Bbs, ref=0 | 2Bbs, ref=0 | 2Bbs, ref=0 | 2Bbs, ref=0 | 2Bbs, ref=0 | 2Bbs, ref=0 |

FIG. 12C

| BANK | TIME → | | | | | |
|---|---|---|---|---|---|---|
| 0 | 0Raf,ref=1 | 0Raf,ref=1 | 0Raf,ref= | 2Bcs,ref=0 | 2Bcs,ref=0 | 2Bcs,ref=0 |
| 1 | 0Ras,ref=1 | 0Ras,ref=1 | 0Ras,ref= | 2Bds,ref=0 | 2Bds,ref=0 | 2Bds,ref=0 |
| 2 | 0Rbf,ref=1 | 0Rbf,ref=1 | 0Rbf,ref=1 | 0Rbf,ref= | 2Bes,ref=0 | 2Bes,ref=0 |
| 3 | 0Rbs,ref=1 | 0Rbs,ref=1 | 0Rbs,ref=1 | 0Rbs,ref= | 0Rbs,ref=0 | 6Raf,ref=1 |
| 4 | 0Rcf,ref=1 | 0Rcf,ref=1 | 0Rcf,ref=1 | 0Rcf,ref= | 0Rcf,ref=0 | 6Ras,ref=1 |
| 5 | 0Rcs,ref=1 | 0Rcs,ref=1 | 0Rcs,ref=1 | 0Rcs,ref= | 0Rcs,ref=0 | 0Rcs,ref=0 |
| 6 | 0Rdf,ref=1 | 0Rdf,ref=1 | 0Rdf,ref=1 | 0Rdf,ref=1 | 0Rdf,ref=1 | 0Rdf,ref=1 |
| 7 | 0Rds,ref=1 | 0Rds,ref=1 | 0Rds,ref=1 | 0Rds,ref=1 | 0Rds,ref=1 | 0Rds,ref=1 |
| 8 | 0Ref,ref=1 | 0Ref,ref=1 | 0Ref,ref=1 | 0Ref,ref=1 | 0Ref,ref=1 | 0Ref,ref=1 |
| 9 | 0Res,ref=1 | 0Res,ref=1 | 0Res,ref=1 | 0Res,ref=1 | 0Res,ref=1 | 0Res,ref=1 |
| 10 | 3Raf,ref=1 | 3Raf,ref=1 | 3Raf,ref=1 | 3Raf,ref=1 | 3Raf,ref=1 | 3Raf,ref=1 |
| 11 | 3Ras,ref=1 | 3Ras,ref=1 | 3Ras,ref=1 | 3Ras,ref=1 | 3Ras,ref=1 | 3Ras,ref=1 |
| 12 | 3Rbf,ref=1 | 3Rbf,ref=1 | 3Rbf,ref=1 | 3Rbf,ref=1 | 3Rbf,ref=1 | 3Rbf,ref=1 |
| 13 | 3Rbs,ref=1 | 3Rbs,ref=1 | 3Rbs,ref=1 | 3Rbs,ref=1 | 3Rbs,ref=1 | 3Rbs,ref=1 |
| 14 | 3Rcf,ref=1 | 3Rcf,ref=1 | 3Rcf,ref=1 | 3Rcf,ref=1 | 3Rcf,ref=1 | 3Rcf,ref=1 |
| 15 | 3Rcs,ref=1 | 3Rcs,ref=1 | 3Rcs,ref=1 | 3Rcs,ref=1 | 3Rcs,ref=1 | 3Rcs,ref=1 |
| 16 | 3Rdf,ref=1 | 3Rdf,ref=1 | 3Rdf,ref=1 | 3Rdf,ref=1 | 3Rdf,ref=1 | 3Rdf,ref=1 |
| 17 | 3Rds,ref=1 | 3Rds,ref=1 | 3Rds,ref=1 | 3Rds,ref=1 | 3Rds,ref=1 | 3Rds,ref=1 |
| 18 | 3Ref,ref=1 | 3Ref,ref=1 | 3Ref,ref=1 | 3Ref,ref=1 | 3Ref,ref=1 | 3Ref,ref=1 |
| 19 | 3Res,ref=1 | 3Res,ref=1 | 3Res,ref=1 | 3Res,ref=1 | 3Res,ref=1 | 3Res,ref=1 |
| 20 | 1Baf,ref=0 | 2Bef,ref=0 | 2Bef,ref=0 | 2Bef,ref=0 | 2Bef,ref=0 | 2Bef,ref=0 |
| 21 | 1Bas,ref=0 | 1Bas,ref=0 | 1Bas,ref=0 | 1Bas,ref=0 | 1Bas,ref=0 | 1Bas,ref=0 |
| 22 | 1Bbf,ref=0 | 2Bas,ref=0 | 2Bas,ref=0 | 2Bas,ref=0 | 2Bas,ref=0 | 2Bas,ref=0 |
| 23 | 1Bbs,ref=0 | 1Bbs,ref=0 | 1Bbs,ref=0 | 1Bbs,ref=0 | 1Bbs,ref=0 | 1Bbs,ref=0 |
| 24 | 1Bcf,ref=0 | 1Bcf,ref=0 | 2Bbs,ref=0 | 2Bbs,ref=0 | 2Bbs,ref=0 | 2Bbs,ref=0 |
| 25 | 1Bcs,ref=0 | 1Bcs,ref=0 | 1Bcs,ref=0 | 1Bcs,ref=0 | 1Bcs,ref=0 | 1Bcs,ref=0 |
| 26 | 1Bdf,ref=0 | 1Bdf,ref=0 | 1Bdf,ref=0 | 1Bdf,ref=0 | 1Bdf,ref=0 | 1Bdf,ref=0 |
| 27 | 1Bds,ref=0 | 1Bds,ref=0 | 1Bds,ref=0 | 1Bds,ref=0 | 1Bds,ref=0 | 1Bds,ref=0 |
| 28 | 1Bef,ref=0 | 1Bef,ref=0 | 1Bef,ref=0 | 1Bef,ref=0 | 1Bef,ref=0 | 1Bef,ref=0 |
| 29 | 1Bes,ref=0 | 1Bes,ref=0 | 1Bes,ref=0 | 1Bes,ref=0 | 1Bes,ref=0 | 1Bes,ref=0 |
| 30 | 2Baf,ref=0 | 2Baf,ref=0 | 2Baf,ref=0 | 2Baf,ref=0 | 2Baf,ref=0 | 2Baf,ref=0 |
| 31 | 2Bbf,ref=0 | 2Bbf,ref=0 | 2Bbf,ref=0 | 2Bbf,ref=0 | 2Bbf,ref=0 | 2Bbf,ref=0 |
| 32 | 2Bcf,ref=0 | 2Bcf,ref=0 | 2Bcf,ref=0 | 2Bcf,ref=0 | 2Bcf,ref=0 | 2Bcf,ref=0 |
| 33 | 2Bdf,ref=0 | 2Bdf,ref=0 | 2Bdf,ref=0 | 2Bdf,ref=0 | 2Bdf,ref=0 | 2Bdf,ref=0 |

DIGITAL VIDEO DECODER AND DEINTERLACER, FORMAT/FRAME RATE CONVERTER WITH COMMON MEMORY

BACKGROUND OF THE INVENTION a. Field of the Invention

The present invention relates to the field of data compression and, more particularly, to a system and techniques for decompressing and displaying digital motion video signals.

b. Related Art

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, and because an uncompressed representation of a video signal typically requires a large amount of storage, the use of digital video compression techniques is important to this advancing art.

Several international standards for the compression of digital video signals have emerged over the past decade, with more currently under development. These standards apply to algorithms for the transmission and storage of compressed digital video in a variety of applications, including: video-telephony and teleconferencing; high quality digital television transmission via coaxial networks, fiber-optic networks, terrestrial broadcast or direct satellite broadcast; and in interactive multimedia products stored on CD-ROM, Digital Tape, and disk drives.

Several of the compression standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms were developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals. Among these standards, the MPEG-2 standard allows for the compression of interlaced or non-interlaced digital video.

Video decoders are typically embodied as general or special purpose processors and memory. For a conventional MPEG-2 decoder, three or more decoded frames are typically stored in memory at the same time.

Often, a video sequence which is encoded in one format must be displayed in another format. For example, a video sequence may be compressed as 60 Hz interlaced video. This video is "meant" to be displayed on a 60 Hz interlaced display: a new decoded field is written to the display every 60th of a second. To display the data on a different display, e.g., a non-interlaced display and/or a display with a different frame rate, the video must go through a process called format/frame rate conversion before display. For example, a 60 Hz interlaced video sequence might be converted to a 50 Hz interlaced sequence (for display on a PAL/SECAM monitor) or to a 72 Hz non-interlaced display (for display on a computer monitor).

There are many methods for format/frame rate conversion, including spatio-temporal filtering and adaptive motion compensation. What these techniques have in common is that to display one picture in the correct output format, several pictures of data in the original format are needed. The method chosen (spatio-temporal filtering or adaptive motion compensation, for example) and the details of that method determine the number of "source" pictures needed, the complexity (including memory requirements) of the conversion device, and the relative quality of the output sequence.

Methods for format/frame rate conversion are well known in the art and therefore are not described here in detail. (See, for example, "The Art of Digital Video" by John Watkinson, Focal Press, 1994).

A conventional method for performing decoding and format/frame rate conversion is to connect the output of a conventional decoder to the input of a conventional format/frame rate converter. This configuration typically employs a dual memory structure wherein several pictures of data are stored in the decoder memory, and several pictures of data are stored in the format/frame rate converter memory.

SUMMARY OF THE INVENTION

In accordance with the principles of the present invention, a video decoder/format/frame rate converter with common memory is provided. Advantageously, this reduces the memory requirements relative to the conventional dual memory systems.

In a preferred embodiment, this device decodes a compressed, interlaced video stream and converts the decoded output to a non-interlaced format and/or a format with a different frame rate. The preferred embodiment of the device uses conventional techniques for video decoding and format/frame rate conversion. However, by using a common memory to share decoded frames the total system cost is reduced.

Advantageously, the present invention can be implemented with a decoder suitable for use with the ISO/IEC MPEG-2 standards.

BRIEF DESCRIPTION OF THE DRAWINGS

FIG. 3 shows an exemplary macroblock subdivision of a 32×32 frame encoded as a frame-structured picture;

FIG. 6 is a timing diagram for a conventional decoder;

FIG. 7 is a flow chart of a decoding and display method in accordance with the principles of the present invention;

FIGS. 12a, 12b and 12c show two examples of memory management in the present decoding process;

DETAILED DESCRIPTION OF THE PREFERRED EMBODIMENTS a. The MPEG-2 Environment

As the present invention may be applied in connection with an MPEG-2 decoder, in order to facilitate the understanding of the invention, some pertinent aspects of the MPEG-2 compression algorithm will be reviewed. It is noted, however, that the invention can also be applied to other video coding algorithms.

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy. Most video compression algorithms are lossy because of stringent bit-rate requirements. A successful lossy compression algorithm eliminates redundant and irrelevant information, allowing relatively large errors where they are not likely to be visually significant while carefully representing aspects of a sequence to which the human observer is very sensitive. The techniques employed in the MPEG-2 algorithm for Step 1 can be described as predictive/interpolative motion-compensated hybrid DCT/DPCM coding. Huffman coding, also known as variable length coding, is used in Step 2.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or noninterlaced component video. Each picture has three components: luminance (Y), red color difference (Cr), and blue color difference (Cb). The video data may be coded in 4:4:4 format, in which case there is one Cr and one Cb sample for each Y sample, in 4:2:2 format, in which case there are half as many Cr and Cb samples as luminance samples in the horizontal direction, or in 4:2:0 format, in which case there are half as many Cr and Cb samples as luminance samples in both the horizontal and vertical directions.

Figure 1:
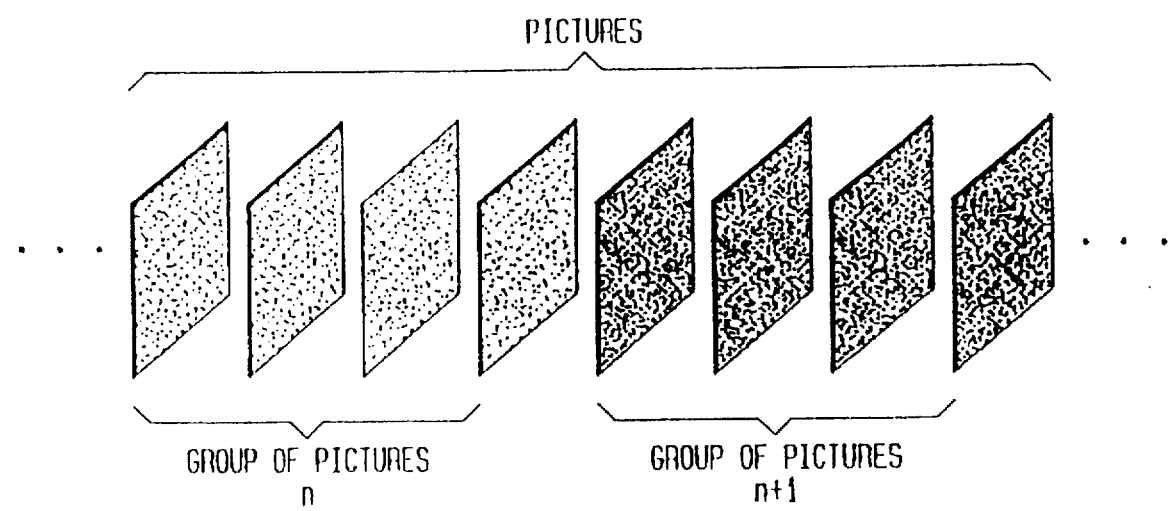
FIG. 1 shows an exemplary pair of Groups of Pictures (GOP's)

An MPEG-2 data stream includes of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOP's. There is no limit to the number of pictures which may be in a GOP, nor do there have to be equal numbers of pictures in all GOP's.

Figure 2:
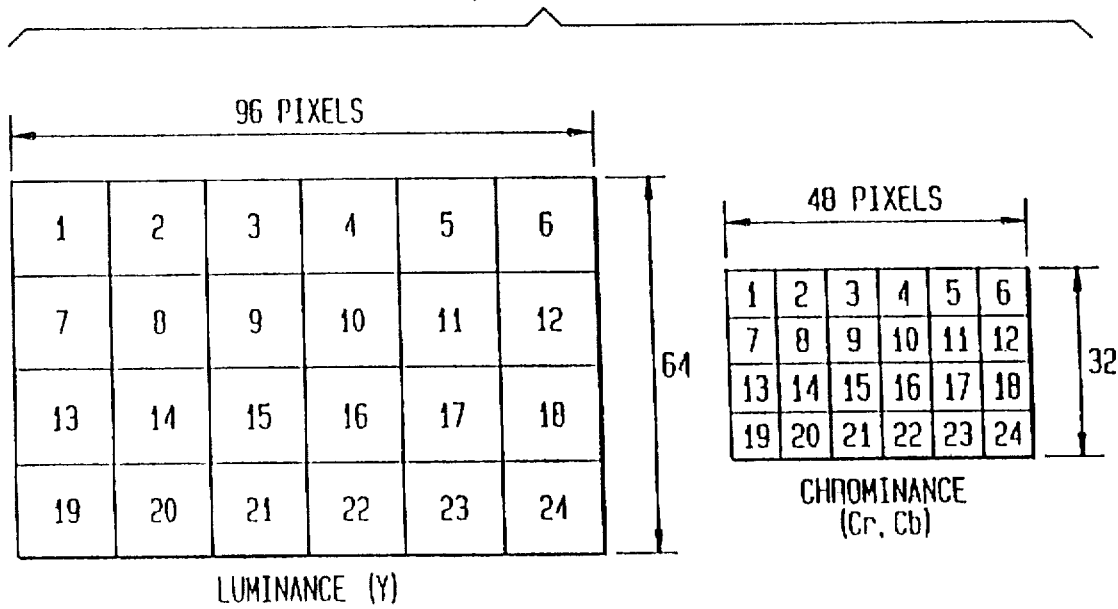
FIG. 2 shows an exemplary macroblock (MB) subdivision of a picture (for 4:2:0 format)

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4, 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a frame-structured picture contains information for C×R pixels and a field-structured picture contains information for C×R/2 pixels.

The two fields in a frame are the top field and the bottom field. If we number the lines in a frame starting from 1, then the top field contains the odd lines (1, 3, 5, . . . ) and the bottom field contains the even lines (2, 4, 6, . . . ). Thus we may also call the top field the odd field and the bottom field the even field.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Figure 3:
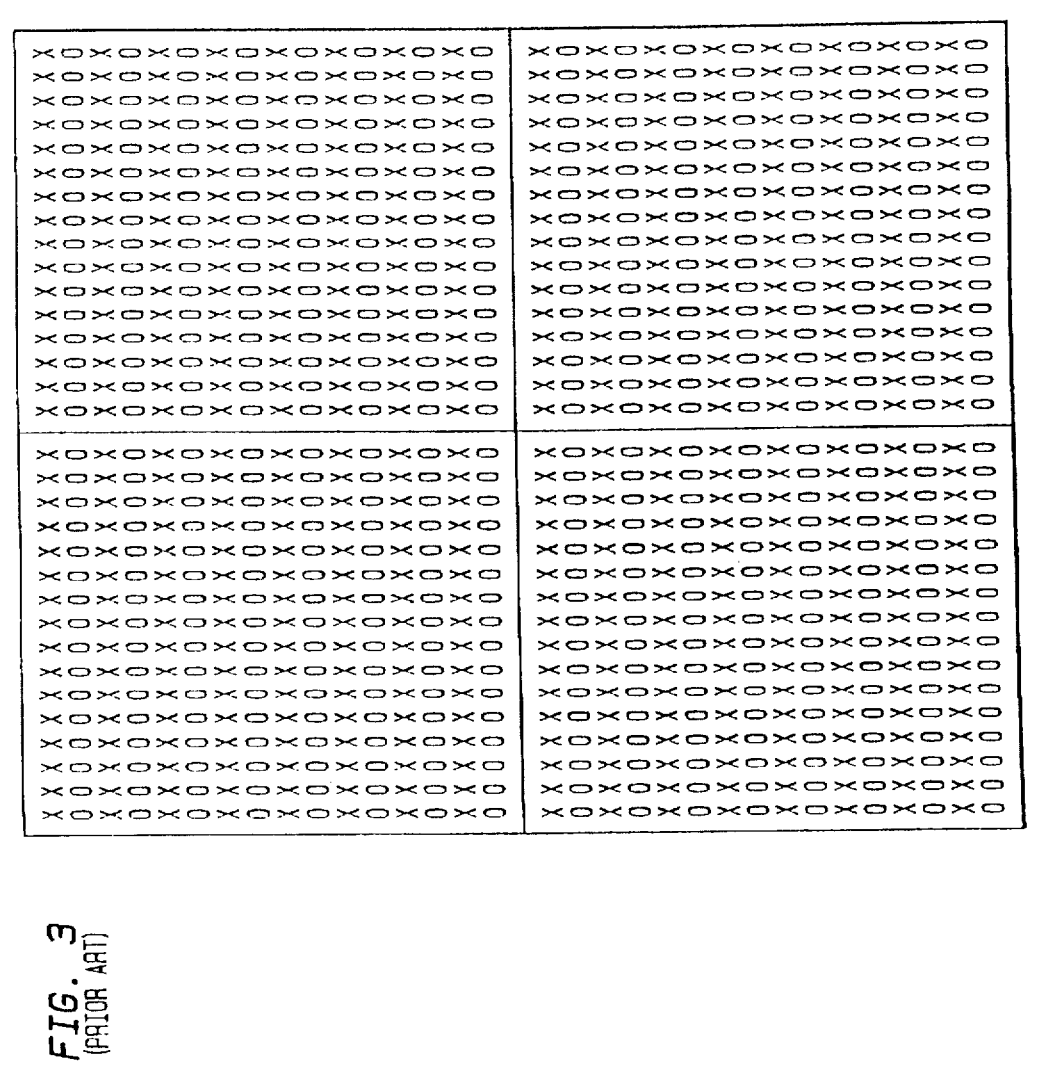

FIG. 3 shows the macroblock partitioning in a 32×32 frame encoded as a frame-structured picture. In this figure, pixels in the top field are represented as x's and pixels in the bottom field are represented as o's. Note that each of the macroblocks contains a 16×8 region from each field.

Figure 4A:
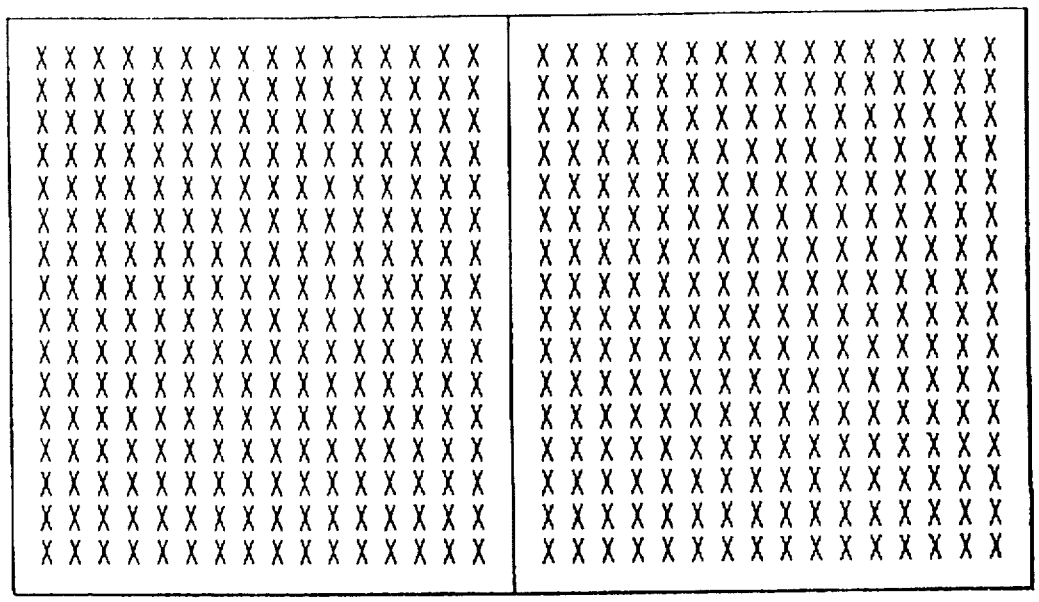
FIGS. 4a and 4b show an exemplary macroblock subdivision of a 32×32 frame encoded as two field-structured pictures.
Figure 4B:
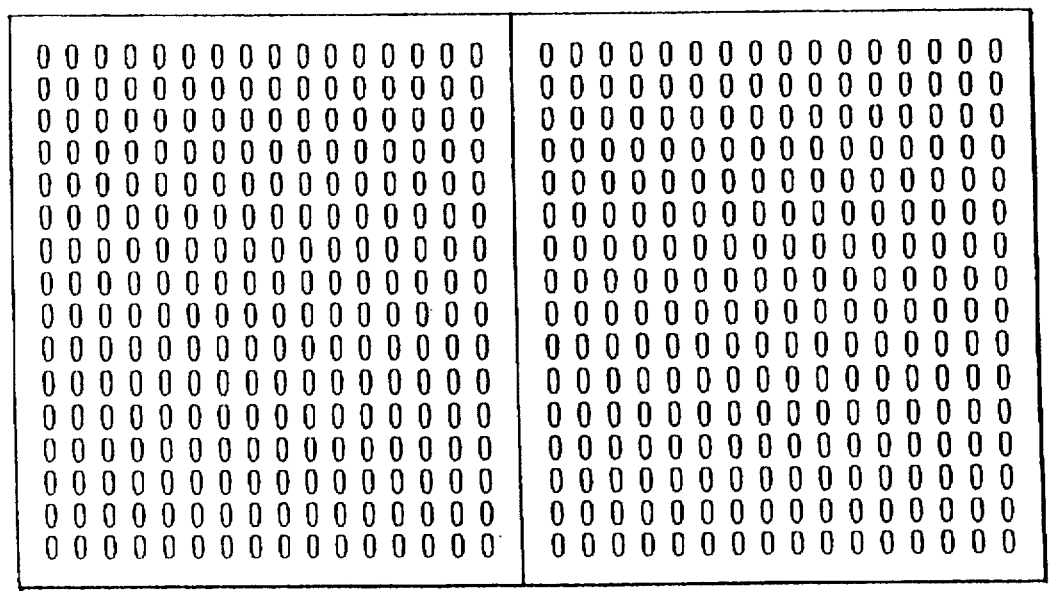

FIGS. 4a and 4b shows the macroblock partitioning in a 32×32 frame encoded as two field-structured pictures. Again, pixels in the top field are represented as x's and pixels in the bottom field are represented as o's. FIG. 4a, depicts the top field picture; each macroblock is an array of 16×16 pixels from the top field. FIG. 4b, depicts the bottom field picture; each macroblock is an array of 16×16 pixels from the bottom field. Note that these pictures are encoded in display order; if the top field is to be displayed first, than the picture associated with the top field will appear in the bit stream first, and if the bottom field is to be displayed first, than the picture associated with the bottom field will appear in the bit stream first.

Within a given GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called reference pictures.

Under the MPEG-2 standard, a frame can be coded either as a frame-structured picture or as two field-structured pictures. If a frame is coded as two field-structured pictures, then both fields can be coded as a I pictures, the first field can be coded as an I picture and the second field as P picture, both fields can be coded as P pictures, or both fields can be coded as B pictures.

If a frame is coded as a frame-structured I picture, as two field-structured I pictures, or as a field-structured I picture followed by a field-structured P picture, we say that the frame is an I frame; it can be reconstructed without using picture data from previous frames. If a frame is coded as a frame-structured P picture or as two field-structured P pictures, we say that the frame is a P frame; it can be reconstructed from information in the current frame and the previously coded I or P frame. If a frame is coded as a frame-structured B picture or as two field-structured B pictures, we say that the frame is a B frame; it can be reconstructed from information in the current frame and the two previously coded I or P frames (i.e., the I or P frames that will appear before and after the B frame). We refer to I or P frames as reference frames.

The picture coding type (I, P or B) as well as well as the picture structure (field-structured or frame-structured) are contained in the header information that begins a coded picture. For a field-structured picture, the header indicates whether the picture is a top field or a bottom field; in the first case, the decoder displays the decoded field as the top set of lines, and in the latter case as the bottom set. For frame structure pictures, the header specifies whether the frame is "top field first". If it is, the top field is displayed first, and if it is not, the top field is displayed second. Referring to FIG. 3, the "x's" will be displayed first if the frame is top field first, and the "o's" will be displayed first otherwise. As mentioned, for a frame encoded as two field-structured pictures the decoder knows which field to display first be the order that the fields are encoded; if the top field is encoded first it is displayed first, and if the bottom field is encoded first it is displayed first.

In each picture header, a 10-bit number called the temporal_reference is encoded. This number counts which frame the picture belongs to in display order. If a frame is encoded as two field-structured pictures, both fields have the same temporal_reference. Because frames are encoded out of order when B frames are used, the temporal reference of frames may differ from their encoded order. The temporal_reference is reset to 0 with each GOP header. If there are more than 1024 pictures in between GOP headers, temporal_reference is counted modulo 1024; i.e., the frame that is to be displayed after the frame with temporal_reference=1023 has temporal_reference=0.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantizing the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

Quantization of the DCT coefficients is the primary source of lossiness in the MPEG-2 algorithm. Denoting the elements of the two-dimensional array of DCT coefficients by $c_{mn}$, where m and n can range from 0 to 7, aside from truncation or rounding corrections, quantization is achieved by dividing each DCT coefficient $c_{mn}$ by $w_{mn}$ times QP, with $w_{mn}$ being a weighting factor and QP being the quantizer parameter. The weighting factor $w_{mn}$ allows coarser quantization to be applied to the less visually significant coefficients. The quantizer parameter QP is the primary means of trading off quality vs. bit-rate in MPEG-2. It is important to note that QP can vary from MB to MB within a picture.

Following quantization, the DCT coefficient information for each MB is organized and coded, using a set of Huffman codes. As the details of this step are not essential to an understanding of the invention and are generally understood in the art, no further description will be offered here.

Most video sequences exhibit a high degree of correlation between consecutive pictures. A useful method to remove this redundancy prior to coding a picture is "motion compensation". MPEG-2 provides tools for several methods of motion compensation (described below).

Many methods of motion compensation have the following in common. For each macroblock, one or more motion vectors are encoded in the bit stream. These motion vectors allow the decoder to reconstruct a macroblock, called the predictive macroblock. The encoder subtracts the "predictive" macroblock from the macroblock to be encoded to form the "difference" macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, 16×16 (S) or 16×8 (E) motion compensation modes can be used. For F macroblock mode, dual-prime (D) motion compensation mode can also be used. We refer to the combination of macroblock mode an motion compensation mode used by a macroblock as the motion compensation "method"; there are seven such methods in MPEG-2: F/S, B/S, FB/S, F/E, B/E, FB/E and F/D. These methods will all be described below.

A macroblock in any picture can be compressed with I macroblock mode. This is the only macroblock mode available in an I picture, and does not use motion compensation.

F macroblock mode can be used in a P or B picture but not in an I picture. When F macroblock mode is used, the predictive macroblock is formed from the most recently decoded top and bottom fields from reference pictures that are to be displayed before the current picture (the previous reference frame). Note that when field pictures are used, the previous frame may consists of two fields that are not displayed consecutively; if a frame is being compressed as two field-structured P pictures, then the previous frame used for the second field is the first field of the current frame and the last decoded field of opposite parity from the last reference picture, so there may be many B pictures in between the two fields of the previous frame.

B or FB macroblock mode can be used in a B picture but not in I or P pictures. When B macroblock mode is used, the predictive macroblock is formed from the two most recently decoded reference fields that are to be displayed after the current picture (the future reference frame). When FB macroblock mode is used, the predictive macroblock is formed from the future reference frame and the previous reference frame.

The method of motion compensation that uses F macroblock mode and S motion compensation mode (F/S) can be described as follows. The encoder sends a single vector in the bit stream. In a frame-structured picture, this vector is used to generate a set of indices in the previous frame, and the predictive macroblock is the 16×16 region located at those indices. In a field-structured picture, the vector is used to generate a set of indices in one of the fields from the previous frame, and the predictive macroblock is the 16×16 region located at those indices. The encoder sends one bit to indicate which of the fields in the previous frame should be used to generate the predictive macroblock.

The B/S method of motion compensation is the same as the F/S method, except that the future frame, rather than the previous frame, is used in generating the predictive macroblock.

The method of motion compensation that uses F macroblock mode and E motion compensation mode (F/E) can be described as follows. The encoder sends two vectors in the bit stream. Each vector is used to form a 16×8 array of pixels from one of the fields in the previous frame. Two bits are sent to indicate which field of the current frame is to be used with each vector. In a frame-structured picture, the predictive macroblock is formed by interleaving these two arrays; the first array provides the even lines of the predictive macroblock and the second array provides the odd lines. (Each array is used for different fields in the predictive macroblock). In a field-structured picture, the first array is used for the first eight lines of the predictive macroblock and the second array is used for the last eight lines.

The B/E method of motion compensation is the same as the F/E method, except that the future frame, rather than the previous frame, is used in generating the predictive macroblock.

The F/D method can only be used in P pictures, and only if there are no B pictures that are displayed in between the current picture and either field of the previous frame. For the F/D method, the encoder sends two vectors, a same-parity vector and a delta vector. These vectors are used to generate two macroblocks which are then averaged to form the predictive macroblock.

In field-structured pictures, the first macroblock is obtained by using the same-parity vector to construct a macroblock from the same-parity field (i.e., from the top field if the current picture is the top field of a frame or the bottom field if the current in the picture is a bottom field) in the same way that a vector is used to construct the predictive macroblock for the F/S method. A second vector is then obtained from the same-parity vector and the delta vector with rules described in the MPEG-2 standard. This second vector is used to construct the second macroblock from the other field (the off-parity) field in the previous frame in the same way that a vector is used to construct the predictive macroblock for the F/S method. In frame-structured pictures, each macroblock that is used (in averaging) to obtain the predictive macroblock for the F/D method is obtained in the following manner. Two vectors are used to construct each macroblock in the same way that two vector are used to construct the predictive macroblock for the F/E method.

The data used to construct the first macroblock comes from the top field of the previous frame, and the data used to construct the second macroblock comes from the bottom field of the previous frame. The first vector used for the first macroblock is the same-parity vector, and the second vector is derived from the same parity vector and the delta vector. The first vector used for the second macroblock is derived from the same parity vector and the delta vector, and the second vector is the same-parity vector.

The FB/S method of motion compensation works as follows. The encoder sends two motion vectors, a forward vector and a backward vector. The forward vector is used to construct a macroblock from the previous frame the same way a vector is used to form the predictive macroblock for the F/S method of motion compensation, and the backward vector is used to construct a macroblock from the future frame the same way a vector is used to form the predictive macroblock for the B/S method of motion compensation. These two macroblocks are averaged to form the predictive macroblock.

The FB/E method of motion compensation works as follows. The encoder sends four motion vectors, two forward vectors and two backward vectors. The forward vectors are used to construct a macroblock from the previous frame the same way two vectors are used to form the predictive macroblock for the F/E method of motion compensation, and the backward vectors are used to construct a macroblock from the future frame the same way two vectors are used to form the predictive macroblock for the B/E method of motion compensation. These two macroblocks are averaged to form the predictive macroblock.

The vectors sent for any mode of motion compensation can be in half-pixel units. In the case of the F/S, F/E, B/S and B/E methods of motion compensation, spatial interpolation is used to generate the predictive macroblock when the vectors used are in half-pixel units. In the case of the FB/S, FB/E and F/D methods, spatial interpolation is used to generate the macroblocks that are averaged to make the predictive macroblock when the vectors used are in half-pixel units.

In every picture header, parameters called f_codes are sent. These determine the maximum absolute value of the components of different motion vectors. Also, the MPEG-2 standard specifies the permissible values of the f_codes for certain cases. For example for a "main profile at main level" MPEG-2 bit stream (intended for use with standard definition television), the largest legal absolute value of a vertical component of a motion vector is 128 frame units or 64 field units.

Based on the value of the f_code's or a bound on them, it is clear that after parts of a frame have been decoded parts of the previous and future frames will no longer be needed to decode that picture. For example, if the maximum value of a vertical component of a motion vector is 128 frame units or 64 field units, and if the current picture is a frame picture with 160 lines (10 macroblock rows) already decoded, then the first 32 lines of the previous and future frames will no longer be needed to decode the current picture.

Aside from the need to code side information relating to the MB mode used to code each MB and any motion vectors associated with that mode, the coding of motion-compensated macroblocks is very similar to that of intra-mode MBs. Although there is a small difference in the quantization, the model of division by wmn times QP still holds.

The MPEG-2 algorithm can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded.

The above-mentioned rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

FIG. 6 shows the timing relationship between decoding and displaying frames in a conventional decoder. After more than half of the second coded reference frame has been decoded, display of the first reference frame begins. Thereafter, the frames are displayed periodically. Note that display of a reference frame begins after about half of the next reference frame has been decoded. Display of a B frame begins after about half of the B frame has been decode. If the B frame is encoded as two field-structured pictures, then each field is fully decoded and then displayed. If the B frame is encoded as a frame-structured picture, then only part (about half) of the first field is decoded before display of the first field begins; however, the decoding of the picture ends before the end of first field needs to be displayed. In this case, the second field is decoded completely before the display of the second field begins.

b. Preferred Embodiment of a Decoder

In accordance with the principles of the present invention, a video decoder/format/frame rate converter with common memory is provided. This device uses conventional techniques for video decoding and format/frame rate conversion, but by using a common memory to share decoded frames the total system cost is reduced.

A decoding and display method in accordance with the principles of the present invention will now be described by reference to FIG. 7.

In step 701, the decoding and display process is initiated. In step 702, the compressed video stream is decoded and stored to memory. Simultaneously with this decoding, the video is displayed in step 703. In step 703, the output pixels for the new format and/or frame rate are computed. Each pixel is computed from one or more pixels from one or more pictures stored in the decoder memory. As previously discussed, methods for format and frame rate conversion (which are used to compute the pixels) are known in the art.

Figure 5:
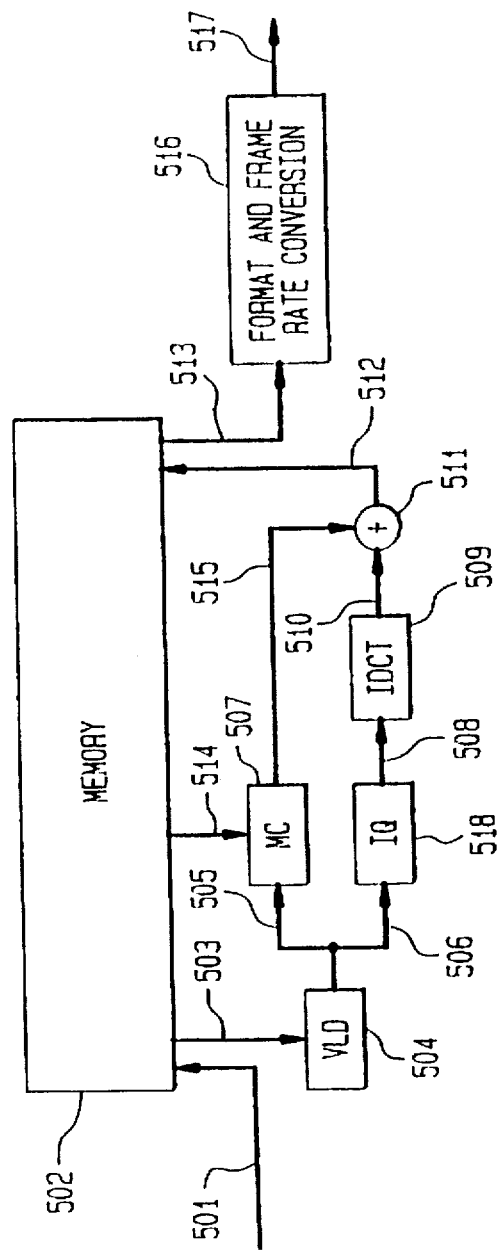
FIG. 5 is a block diagram of a combined video decoder and format/frame rate converter according to an embodiment of the present invention.

FIG. 5 is a diagram of a combined video decoder and format converter according to the principles of the current invention. Compressed data is read as signal 501 into the memory unit 502. The compressed data is then read from memory as signal 503 to the variable length decoder unit 504. The variable length decoder unit sends the motion compensation information as signal 505 to the motion compensation unit 507.

The motion compensation unit reads the reference data from the memory unit 502 as signal 514 to form the predicted macroblock, which is sent as the signal 515 to the adder 511. The variable length decoder unit also sends quanitised coefficients and quantization_scale as signal 506 to the inverse quantization unit 518, which computes the unquantized coefficients. These coefficients are sent as signal 508 to the inverse transform unit 509.

The inverse transform unit computes the reconstructed difference macroblock as the inverse transform of the unquantized coefficients. The reconstructed difference macroblock is sent as signal 510 to the adder 511, where it is added to the predicted macroblock. The adder 511 computes the reconstructed macroblock as the sum of the reconstructed difference macroblock and the predicted macroblock. The reconstructed macroblock is then stored to the memory unit 502 as the signal 512. The reconstructed data is read out from the memory unit 502 as the signal 513 to the de-interlacing and frame rate conversion unit 516, which computes the output pixels 517.

In one embodiment of the present invention, the decoder views the available memory as being divided into separate logical "banks". When a picture is decoded, the picture is divided into regions with each region stored to a different bank. The bank chosen to store to is one that will not prevent further decoding (by writing over a reference frame that will be needed for decoding other pictures) and maintains as many frames as possible for display. In this embodiment, each bank is marked either as ref=0 (meaning that the data in the bank is not needed for future decodes) or ref=1, meaning that the data is needed for future decodes.

Figure 8:
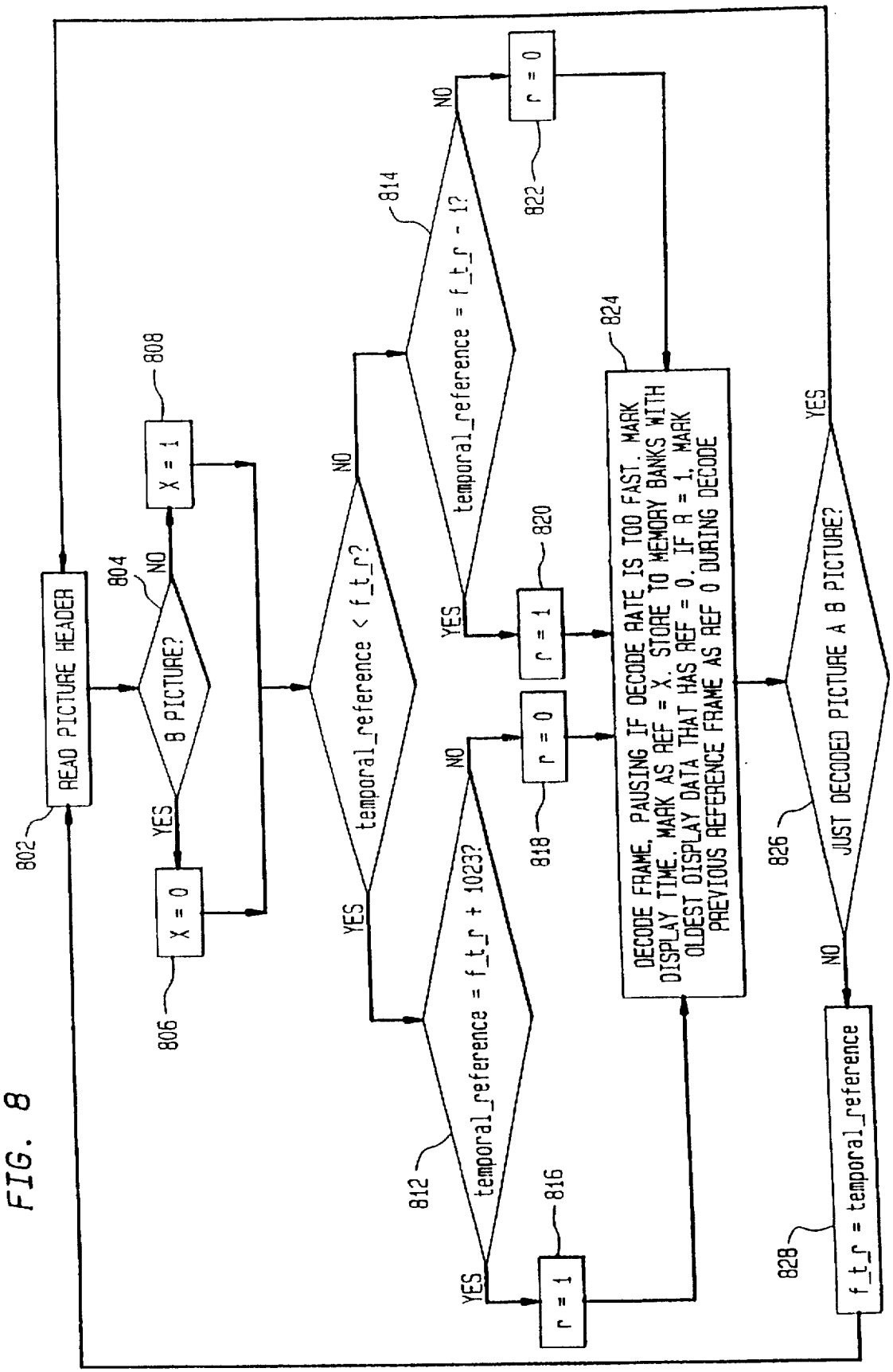
FIG. 8 is a flow chart of a decoding method in accordance with the principles of the present invention.

A flow chart for operation of the decoder of FIG. 5 in accordance with the above-described embodiment is shown in FIG. 8. In step 802, a picture header is read in. In step 804, the coding type of the picture is checked; if it is B picture, control goes to step 806, and otherwise control goes to step 808. In step 806 a variable x is set to 0, whereas in step 808 x is set to 1. After either step 806 or 808, control goes to step 810. Step 810 checks if temporal_reference for the current frame is less than the variable f_t_r. If it is, then control goes to step 812; otherwise control goes to step 814. Step 812 checks if temporal_reference is equal to f_t_r+1023; if it is, control goes to step 816, where the variable r is set equal to 1; otherwise, control goes to step 818, where r is set equal to 0.

Step 814 checks if temporal_reference is equal to f_t_r−1; if it is, control goes to step 820, where the variable r is set equal to 1; otherwise, control goes to step 822, where r is set equal to 0. Note that r=1 if and only if the current frame is the frame before the future frame. After step 816, 818, 820 or 822, control goes to step 824.

In step 824 the current frame (one frame-structured or two field structured pictures) is decoded. The decoding is paused if it is too fast relative to the display or if no memory banks with ref=0 are available. The decoded data is stored to memory banks with ref=0 and the oldest data in display order. The banks that the data is stored to are marked to show when they should be displayed.

In this embodiment, different fields are stored to different banks, so if the picture is frame-structured half of a decoded macroblock is stored to one bank and half to another. The banks that the data is stored to are marked ref=x. If r=0, the now previous frame, which is needed to decode the current frame, will not be needed to decode other pictures. Based on either the value of f_code or a priori bounds, parts of the previous frame that will not be needed to decode the current frame (and therefore will not be needed for any future decoding) are marked as ref 0.

After step 824, control goes to step 826, which checks if the just decoded picture was a B picture. If it was, control returns to step 802, otherwise, control goes to step 828. In step 828, f_t_r is set to temporal_reference of the just decoded frame.

Because the present decoding and display method displays an "image" from data in several decoded fields (or frames), when we describe the relationship between decoding and displaying a field, we cannot really talk about when a field is displayed relative to when it is decoded. For notational convenience, when we say that we display a field x, we mean that we display an image based on data in field x and possibly fields that occur earlier in time (but not fields that occur later in time). An image in this context is either a whole frame (for non-interlaced display) or a field (for interlaced display).

For example, when converting 60 Hz interlaced data to 60 Hz non-interlaced data and computing one output frame from three input fields, displaying the frame computed from fields 1, 2, and 3 is called "displaying field 3", displaying the frame computed from fields 2, 3, and 4 is called "displaying frame 4" and so on. In one embodiment, an output frame rate that differs from the input frame rate is obtained by displaying some frames multiple times.

With the terminology just introduced (when we say that we display a decoded field we mean that we display an image based on data in that field and previous fields), we maintain roughly the same timing relationship between decoding and displaying as is shown in FIG. 6.

Figure 9:
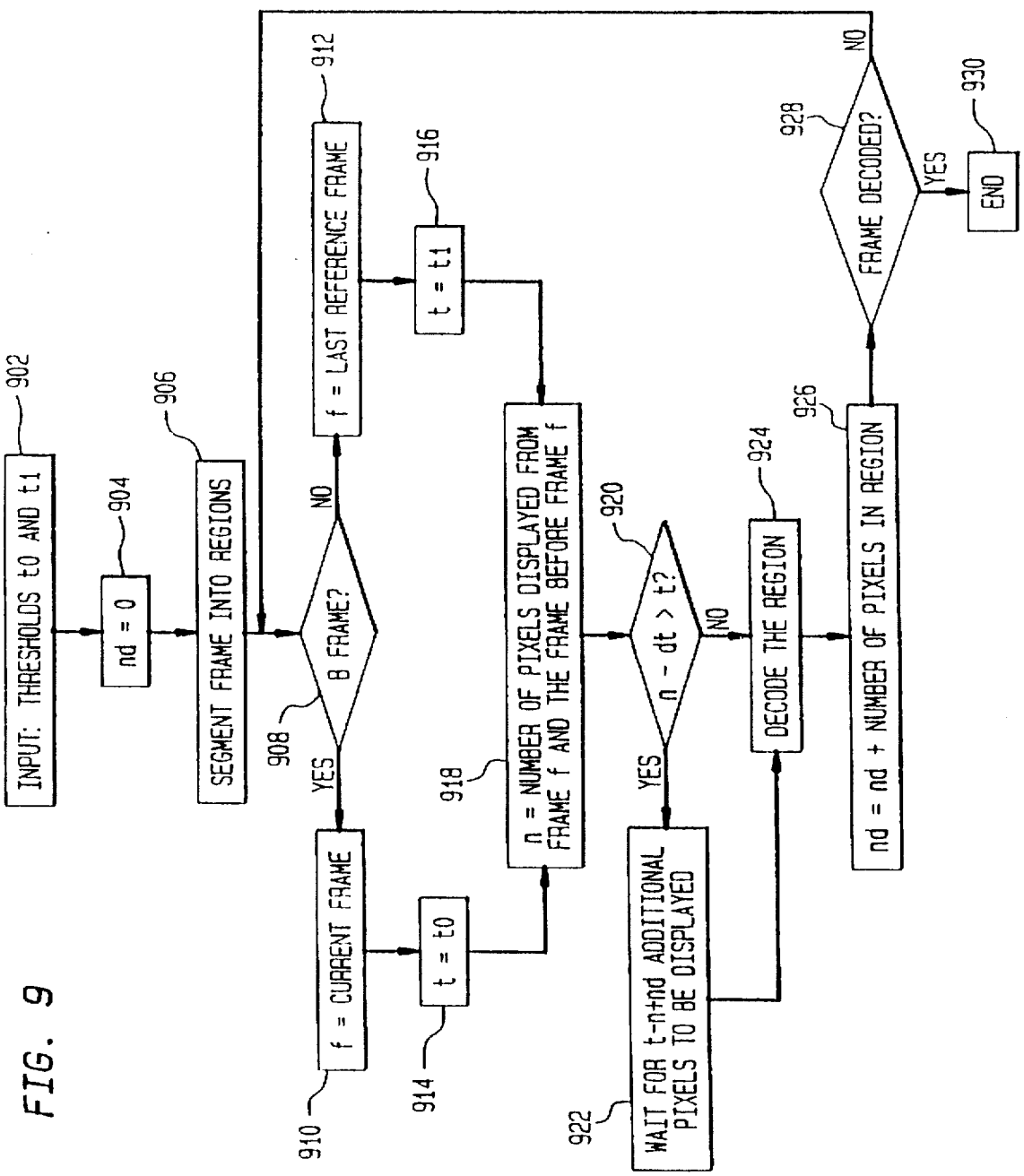
FIG. 9 is a flow chart of a method for determining if the decode rate is too fast relative to the display in the decoding method of FIG. 8.

In step 824 of FIG. 8, the decoding pauses when the decode is too fast relative to the display. FIG. 9 is a flow chart of a method for determining if the decode is too fast relative to the display during the decoding of one frame. In step 902, the thresholds t0 and t1 are input. After step 902, the variable nd (number of decoded pixels) is set to 0 in step 904. After step 904, the frame is segmented into regions in 906. After step 906, control goes to step 908. Step 908 checks if the current frame is a B frame. If it is, control goes to step 910; otherwise, control goes to step 912. In step 910, the variable f is set to the current frame. After step 910, control goes to step 914, where the variable t is set equal to t0. In step 912, the variable f is set to the last decoded reference frame. After step 912, control goes to step 916, where the variable t is set equal to t1. After step 916 or 914, control goes to step 918, where the variable n is set to the number of pixels displayed from frame f and the frame before frame f. After step 918, control goes to step 920.

Step 920 checks if n−nd is less than t. If it is (decode too fast), control goes to step 922. Step 922 waits until t−n+nd additional pixels are displayed. After step 920 or 922, control goes to step 924, where the next region is decoded. After step 924, the variable nd is incremented by the number of pixels in the just decoded region. After step 926, control goes to step 928, which checks if the frame has been fully decoded. If it has, control goes to step 930, where the process exits, otherwise control returns to step 908.

The number of fields available to "display" a field depends on a number of factors, including: the number and size of the memory banks, the size of the decoded pictures, the picture coding type and picture structure of each picture. Because it is often not possible to know all of these variables (in particular the last two) in advance, it is desirable to have a method to determine how many fields to use to display each field, and to use that method consistently.

For example, if the memory is divided up into a relatively large number of memory banks, the total amount of memory used to store decoded data is slightly more than three frames (about the amount of memory used in conventional decoders) and if the no more than two B frames occur between reference frames (as is often done but not required by the MPEG-2 standard), then there will be three fields available to display each field. On the other hand, if the last condition is not satisfied then there will be some fields for which only two fields are available for display.

To further illustrate the principles of the present invention, examples of the memory management of the decoder are shown in FIGS. 12a–12c. The frames are (in display order) a reference frame, 2 B frames, a reference frame, 2 B frames, and then a reference frame. The encoding order is shown in FIG. 12a. The encoding order differs from the display order because reference frames that are needed as future references for B frames are encoded before those B frames.

In the examples of FIG. 12, each field fits in 5 memory banks (10 per frame needed), and there are a total of 34 memory banks. Each field is segmented into 5 sections (a–e) that are stored to different banks, and it is assumed that the motion vectors are small enough so that to reconstruct data in one section of one field only that section or adjacent sections from fields in the previous and future frames are needed. For example, to reconstruct section b we only need sections a–c of the previous and (for B frames) future frames.

In FIG. 12b, all frames are encoded as frame-structured pictures. We have marked the usage of each memory bank through time. Each bank is labeled as the frame number (in display order), the type (R for reference and B for B) the segment (a–e) the field (f for first and s for second) and "ref=0", "ref=1" or "ref=". The designation "ref=" means that the that bank will be marked "ref=0" when the segment currently being decoded is completed. For example, 3 Rbf, ref=1 is segment b from the first field of frame 3, which is a reference frame, and the data is needed for future decodes (ref=1).

At the beginning of FIG. 12b, frames 0, 3 and 1 have been decoded, as has section a from both fields of frame 2. Section b is being decoded, and when it is finished memory banks 0 and 1 will be marked "ref=0". As the decode of frame 2 continues, frame 2 overwrites frame 0. Then frame 6 is decoded, overwriting first the remaining parts of frame 0 and then parts of frame 1.

The example of FIG. 12c differs from FIG. 12b only in that in FIG. 12c frame 2 is encoded as two field-structured pictures. At the beginning of this example, frames 0, 3 and 1 have been decoded, as have sections a–c from the first field of frame 2. Section e from the first field of frame 2 overwrites part of the first field of frame 1, and the second field of frame 2 is written first to banks that hold the first field of frame 1 and then to parts of frame 0 as frame 0 is marked "ref=0".

It is noted that, if to construct an output pixel (for format/frame rate conversion) only a small region near that pixel in three consecutive fields are needed, then in the examples of FIGS. 12b and 12c it will always be possible to use three fields to construct each output image.

Figure 10:
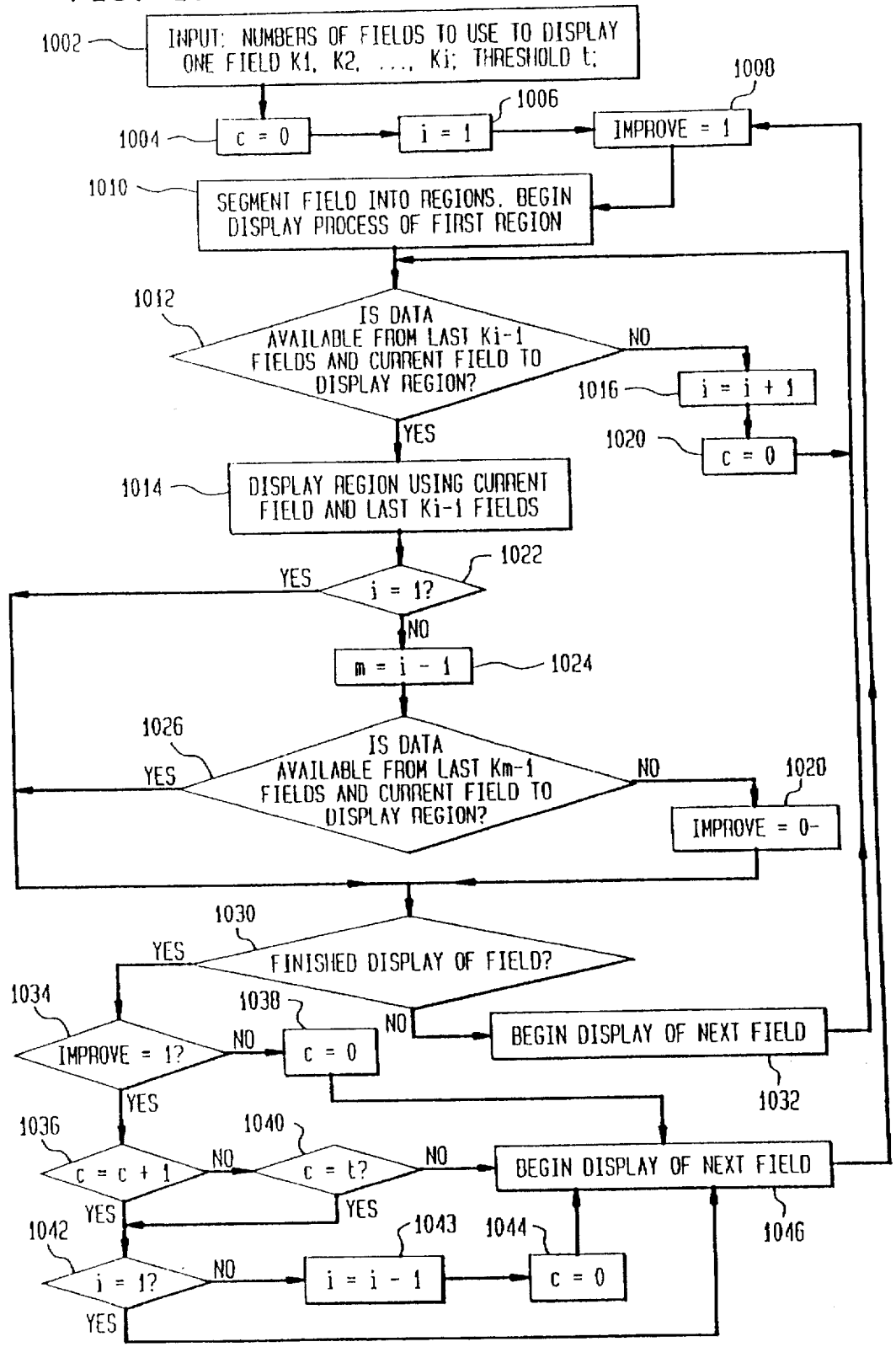
FIG. 10 is flow chart of a method to chose the number of fields to use for format/frame rate conversion in the system of FIG. 5.

FIG. 10 is a flow chart of a method, which can be used by the system of FIG. 5, to chose the number of fields to use for format/frame rate conversion adaptively based on an estimate of how many fields will consistently be available to display each field.

In step 1002 a set of j numbers, k1, k2, . . . kj are input; these numbers are candidate numbers of fields used to display one field, and are arranged so that k1>k2 . . . >kj. (Thus it is most desirable to use k1 fields, but only if we expect to consistently have k1 fields available). Also input at step 1002 is a threshold t. (This threshold determines how many fields we must see that could use more fields to be displayed before we start displaying each field with more fields.)

In step 1004 a variable c is set to 0. (The variable c is used to count the number of fields that are displayed with a certain number of fields for which a larger number could have been used.) In step 1006 the variable i is set to 1. (The variable i indicates that we are currently using ki fields to display each field.) In step 1008, the variable improve is set to 1. (The variable improve is equal to one if all regions in the current field could have been displayed using more than ki fields.) In step 1010, the field is segmented into regions, and the display process of the first region is begun.

After step 1010, control goes to step 1012, which checks if data in the current field and the previous ki–1 fields are available to display the region. If they are, control moves to step 1014; otherwise, control moves to step 1016. In step 1014, the region is displayed using the current field and the last ki–1 fields; control then moves to step 1022.

In step 1016, the variable i is incremented (the system decides to start using fewer fields to display each field), and control then moves to step 1020. In step 1020, the variable c is set to 0, and control then returns to step 1012. In step 1022, we check if i=1. If it is (no improvement to display with more fields possible) , control goes to step 1032; otherwise control goes to step 1024. In step 1024, the variable m is set to i–1, and control then moves to step 1026.

In step 1026, it is determined if data in the current field and the previous km–1 fields are available to display the region (i.e., if the region could have been displayed using km rather than ki fields). If the data is available, control goes to step 1030; otherwise, control goes to step 1028, where the variable improve is set equal to 0. After step 1028, step 1030 is performed. In step 1030, it is determined if display of the field has been completed (finished), if display of the field has been completed, control moves to step 1034; otherwise, control moves to step 1032. In step 1032, the display process of the next region is initiated and the process returns to step 1012.

In step 1034, it is determined whether improve=1, if it does (the entire field could have been displayed with km fields) control moves to step 1036, otherwise control moves to step 1038. In step 1038, the variable c is set to 0, and control then moves to step 1046. In step 1036, the variable c is incremented, and control then moves to step 1040. Step 1040 checks if c=t; if it does, control moves to step 1042; otherwise, control goes to step 1046. Step 1042 checks if i=1; if it does, control moves to step 1046; otherwise, control moves to step 1043. In step 1043, the variable i is decremented, and control then moves to step 1044. In step 1044, the variable c is set to 0, and control then goes to step 1046. In step 1046, display of the next field is initiated, and control then returns to step 1008.

Figure 11:
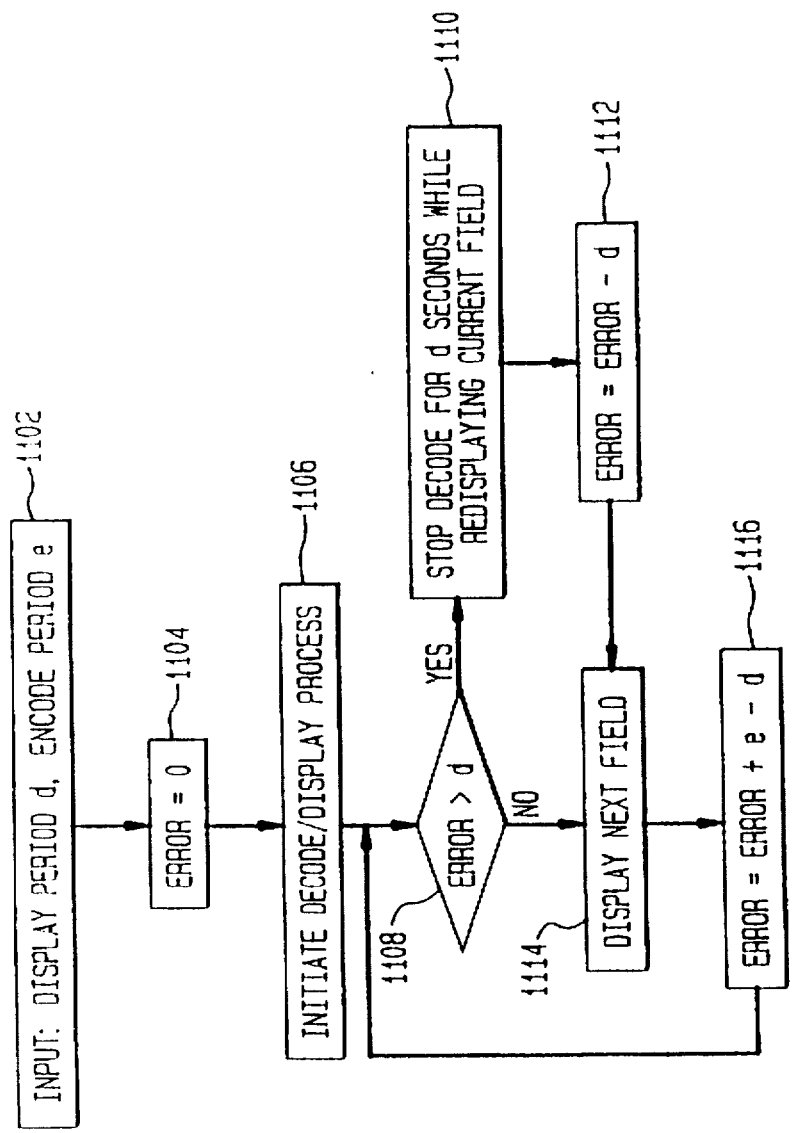
FIG. 11: Flow chart of a method for performing frame rate conversion according to an embodiment of this invention.

The method of FIG. 10 shows how to do format conversion according to an embodiment of this invention. FIG. 11, shows a method for performing frame rate conversion which can be used by the system of FIG. 5. Using the methods of FIGS. 10 and 11, one can perform combined format/frame rate conversion and video decoding.

FIG. 11 is a flow chart of a method for performing frame rate conversion according to an embodiment of this invention. In step 1102, the display period d and encoding period e are input. For example, if the video is encoded as 60 Hz interlaced video and the display is 72 Hz non-interlaced, then d=1/72 and e=1/60. In step 1104, the variable error is set to zero. In step 1106, the combined decode/display process is initiated. After step 1106, control goes to step 1108, which checks if error is greater than d. If it is, control goes to step 1110; otherwise, control goes to step 1114.

In step 1110, the decoding is stopped for d seconds and the just displayed field is displayed again; control then moves to step 1112. In step 1112, the variable error is decremented by d, and control then moves to step 1114. In step 1114, the next field is displayed, and control then moves to step 1116. In step 1116, the variable error is incremented by e–d, and control than returns to step 1108.

Figure 13:
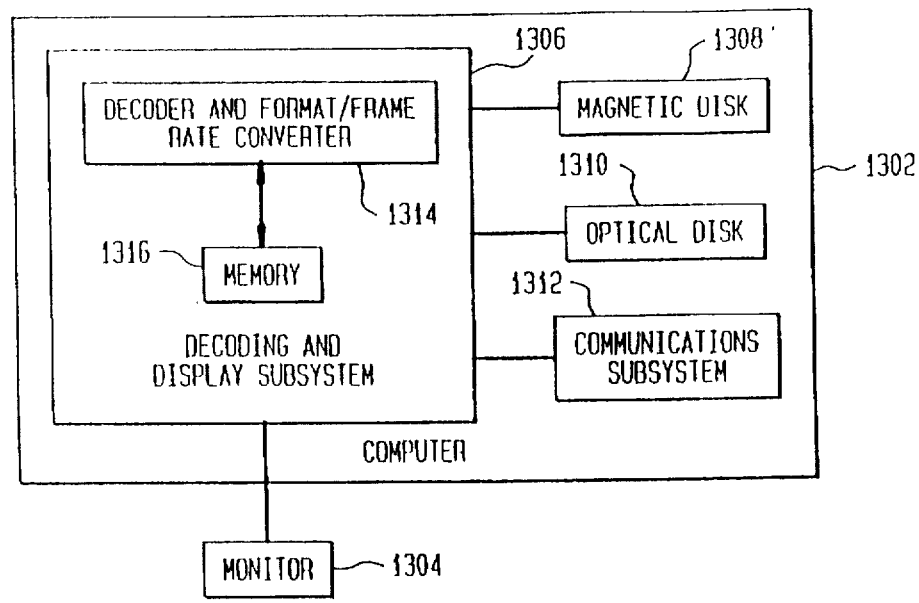
FIG. 13 shows a computing system having the combined video decoder and format converter of FIG. 5 as part of its decoding and display subsystem; and, FIG. 14 shows the combined video decoder and format converter of FIG. 5 as part embodied within a television set or set-top box.

FIG. 13 shows a computing system having the combined video decoder and format/frame rate converter of FIG. 5 as part of its decoding and display subsystem 1306. In this embodiment the combined decoder and format/frame rate converter is embodied as an application specific integrated circuit (ASIC) 1314 coupled to a memory 1316. The decoding and display subsystem 1306 is connected to selectably receive a compressed video input from any of magnetic disk 1308, and optical disk (CD ROM) 1310 and a communication subsystem (such as a modem) 1312. The compressed video input is processed by the combined decoder and format/frame rate converter. The converted and/or reformatted video is provided to a conventional monitor 1304 which is coupled to the display subsystem 1306.

Figure 14:
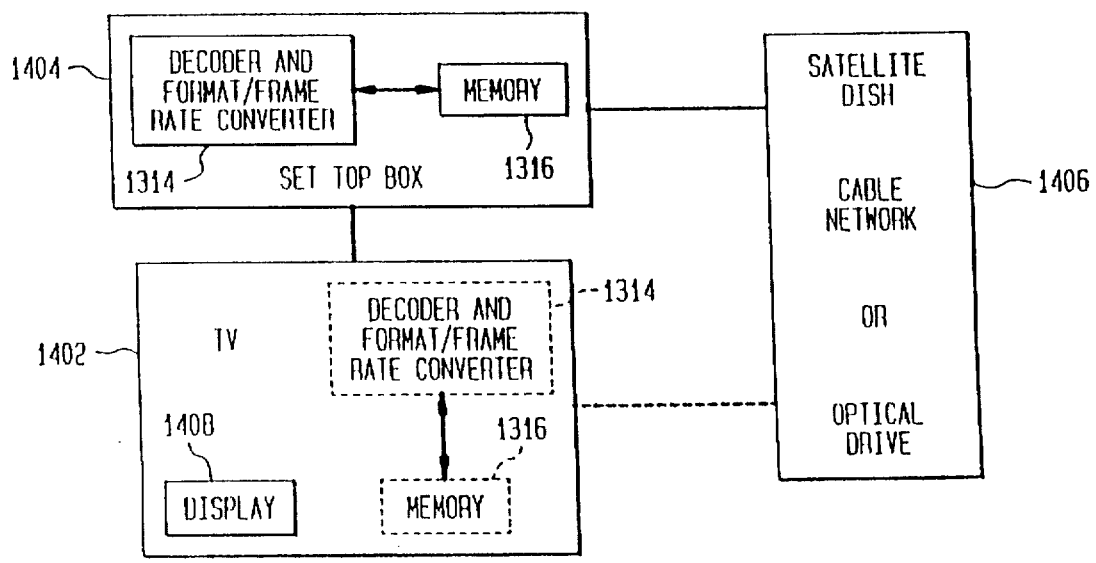

FIG. 14 shows the combined video decoder and format/ frame rate converter of FIG. 5 as part embodied within a television set 1402 or set-top box 1404. As in FIG. 13, the combined decoder and format/frame rate converter is embodied as an application specific integrated circuit (ASIC) 1314 coupled to a memory 1316. In either embodiment (integrated into a television set or set top box) the combined decoder format/frame rate converter receives its compressed video input from an input source 1406 such as a satellite dish, cable network or optical drive. The converted and/or reformatted video is provided to a the display 1408 of the television set 1402.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for changing at least one of an original display format and an original frame rate of video information provided in compressed form, comprising the steps of:

a) decompressing one or more pictures having an original display format and an original frame rate from a compressed form;

b) storing said decompressed one or more pictures in a shared common memory; and, c) integrating and sequencing said decompression with at least one of frame rate conversion and format conversion of said decompressed one or more pictures stored in said shared common memory, and d) outputting a picture having a display format and a frame rate at least one of which differs from the original format and frame rate.

2. The method of claim 1 comprising the further step of providing the output picture to a display device.

3. The method of claim 1, where the original format is interlaced and the second display format is non-interlaced.

4. The method of claim 1, where the original format is non-interlaced and the second display format is interlaced.

5. The method of claim 1 comprising the further steps of:
determining when the reconstruction will interfere with the extraction and pausing the reconstruction in response to a determination that the reconstruction will interfere.

6. The method of claim 1 comprising the further steps of identifying locations in the common memory that do not hold reference data that will be needed for future reconstruction and limiting storage of the pictures to the locations.

7. The method of claim 6 wherein the locations identified are those that hold the information required for earliest display.

8. The method of claim 1 wherein the pictures are interframe encoded.

9. The method of claim 6, wherein the identifying locations comprises the further steps of:
determining whether a picture is a bidirectional picture;
determining whether the picture about to be reconstructed is in a frame that is temporally immediately before a reference frame stored in the common memory;
when it is determined that the picture is a bidirectional picture identifying the locations of the common memory containing the picture as not containing reference data needed for future reconstructions; and,
when it is determined that the picture about to be decoded is in the frame that is temporally immediately before the reference frame, as the picture is being reconstructed, identifying the locations of the memory containing parts of the previous reference frame as not containing reference data need for future reconstructions.

10. The method of claim 5, wherein the determining of whether the reconstruction will interfere with the extraction comprises the steps of:
segmenting the picture into regions, and for each region:
determining whether the picture being reconstructed is a bidirectional picture:
determining a number of pixels reconstructed from a current frame;
when the picture being reconstructed is a bidirectional picture:
determining a first total number of pixels displayed from both a current frame and the frame immediately before the current frame;
when the difference between the number of pixels reconstructed and the first total number is greater than a threshold, pausing the reconstruction until a number of additional pixels equal to the sum of the threshold and the pixels reconstructed minus the first total number are displayed; and,
when the picture being reconstructed is not a bidirectional picture:
determining a second total number of pixels displayed from both an immediately previous reference frame and the frame immediately before the immediately previous reference frame; and,
when the difference between the number of pixels reconstructed and the second total number is greater than a threshold, pausing the reconstruction until a number of additional pixels equal to the sum of the threshold and the pixels reconstructed minus the second total number are displayed.

11. The method of claim 1, where a number of fields used to compute each output image is adaptively determined as follows:
determining a number of fields to use to display each output image;
segmenting each output image into regions
for each region, checking if the pixels in the number of fields are available in the memory; when the pixel are available in the memory, using the number of fields, and when the pixels are not available in the memory, decreasing the number of fields and then using the number of fields to display the region;
for each region, checking if a larger number of fields could have been used to display that region, when it is determined that a larger number of fields could be used to display more than a threshold number of regions, increasing the number.

12. The method of claim 1, where the frame rate conversion consists of the further steps of:
selecting an initial display time error;
displaying each output image and then incrementing the display time error by the difference between the encoded period and the display period;
for each output image, checking, before display, if the display time error is greater than the display period, and, if it is, redisplaying the output image and decrementing display time error by the display period.

13. A method changing the format of video information provided in compressed form from an original format, comprising the steps of:
applying a reconstruction process to reconstruct pictures having the original format from the compressed form of the video information;
storing at least a portion of at least some of the pictures in a shared common memory directly accessible by the reconstruction process and a reformatting process;
commencing the reformatting process to reformat the pictures;
determining which portions of the pictures are no longer needed to produce an output picture having a different format from the original format;
controlling the common memory and reconstruction process to allow only areas of memory which are storing portions of pictures which are no longer needed to be overwritten.

14. A method changing the display rate of video information provided in compressed form having an original display rate, comprising the steps of:
applying a reconstruction process to reconstruct pictures having the original display rate from the compressed form of the video information;

storing at least a portion of at least some of the pictures in a shared common memory directly accessible by the reconstruction process and a rate conversion process;

commencing the rate conversion process to change the display rate of the pictures;

determining which portions of the pictures are no longer needed to produce an output picture having a different display rate from the original display rate;

controlling the shared common memory and reconstruction process to allow only areas of memory which are storing portions of pictures which are no longer needed to be overwritten.

15. A video decoder and format converter, comprising:

a shared common memory;

a decoder having an input for receiving a compressed video stream and an output for providing to the common memory, pictures of a first format decoded from the compressed video stream; and, a format converter having an input connected to receive the pictures from the shared common memory and an output for providing reformatted picture of a second display format formed from information extracted from a plurality of the pictures in the shared common memory.

16. The video decoder and format converter of claim 15, further comprising:

a memory management system, coupled to said shared common memory, said memory management system including means for identifying picture information that is likely to be needed to decode a future picture and means for directing memory writes to memory locations in said shared common memory not currently storing information is likely to be needed to decode a future picture.

17. A video decoder and frame rate converter, comprising:

a shared common memory;

a decoder having an input for receiving a compressed video stream and an output for providing to the common memory, pictures having a first display rate decoded from the compressed video stream; and, a rate converter having an input connected to receive the pictures from the shared common memory and an output for providing a picture at a second display rate formed from information extracted from a plurality of the pictures in the shared common memory.

18. The video decoder and frame rate converter of claim 17, further comprising:

a memory management system, coupled to said shared common memory, said memory management system including means for identifying picture information that is likely to be needed to decode a future picture and means for directing memory writes to memory locations in said shared common memory not currently storing information is likely to be needed to decode a future picture.

19. An apparatus for changing the format and frame rate of interframe encoded video, comprising:

a shared common memory;

a decoder having an input for receiving a compressed video stream and an output for providing to the common memory, pictures of a first format decoded from the compressed video stream; and, a format and frame rate converter having an input connected to receive the pictures from the shared common memory and an output for providing reformatted picture of a second display format and a second display rate formed from information extracted from a plurality of the pictures in the common memory;

decoder controller means, coupled to said decoder, for determining when storage of reconstructed pictures in the common memory will interfere with the extraction and pausing the decoder in response to a determination that the storage will interfere; and, a memory management system, coupled to said common memory, said memory management system including means for identifying picture information that is likely to be needed to decode a future picture and means for directing memory writes to memory locations in said shared common memory not currently storing information is likely to be needed to decode a future picture.

20. The apparatus of claim 19 wherein the memory management system comprises:

means for determining whether a picture is a bidirectional picture;

means for identifying the locations of the shared common memory containing the bidirectional picture as not containing reference data needed for future reconstructions.

21. An apparatus capable of displaying video images, comprising:

a display device;

a source of compressed video;

a video decoder and format converter, having:

a shared common memory;

a decoder having an input for receiving the compressed video from the source and an output for providing to the shared common memory, pictures of a first format decoded from the compressed video; and, a format converter having an input connected to receive the pictures from the common memory and an output for providing to the display device, reformatted pictures of a second display format, each of the reformatted pictures being formed from information extracted from a plurality of the pictures in the shared common memory.

22. An apparatus capable of displaying video images, comprising:

a display device;

a source of compressed video;

a video decoder and frame rate converter, having:

a shared common memory;

a decoder having an input for receiving the compressed video from the source and an output for providing to the shared common memory, pictures of a first frame rate decoded from the compressed video; and, a frame rate converter having an input connected to receive the pictures from the common memory and an output for providing to the display device, pictures of a second frame rate, each of the pictures of the second frame rate being formed from information extracted from a plurality of the pictures in the shared common memory.

23. The apparatus of claim 22 wherein the frame rate converter also include a format converter which converts each of the pictures to a new format different from an original format as provided by the compressed video.

* * * * *